June 23, 1936.   L. O. E. ROESSEL   2,044,812
ANTISKIDDING DEVICE FOR AUTOMOBILES
Filed June 8, 1935   2 Sheets-Sheet 1

LOUIS OTTO E. ROESSEL
INVENTOR

BY John P. Nixonow
ATTORNEY

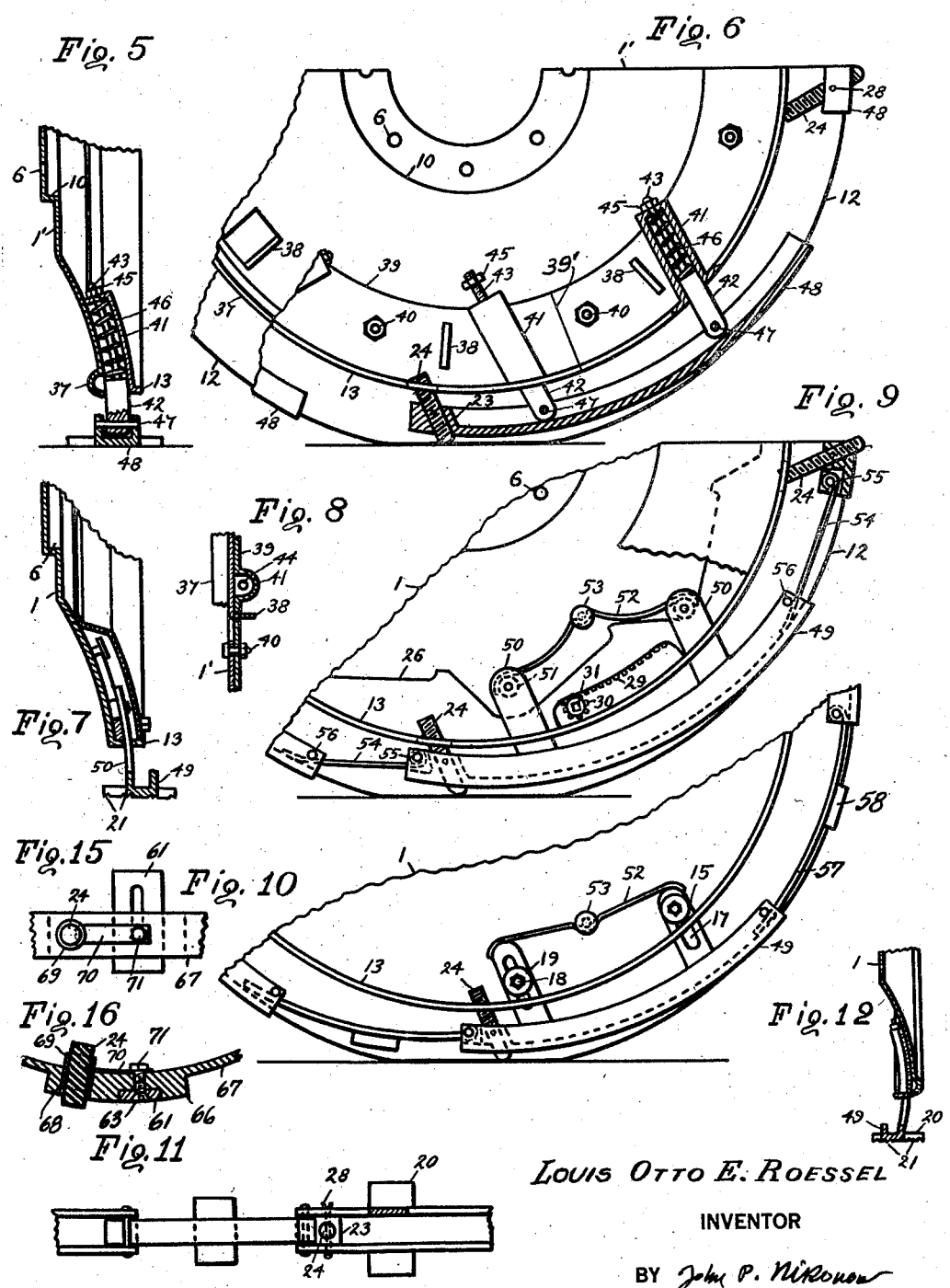

Patented June 23, 1936

2,044,812

UNITED STATES PATENT OFFICE 2,044,812

ANTISKIDDING DEVICE FOR AUTOMOBILES

Louis Otto E. Roessel, Chappaqua, N. Y.

Application June 8, 1935, Serial No. 25,598

9 Claims. (Cl. 301—47)

My invention relates to antiskidding devices for automobiles and has particular reference to devices forming supplementary resilient antiskidding wheels.

It is well known that a large percentage of automobile accidents are caused by skidding on wet or icy road surface. Tire chains, while affording a certain degree of protection against skidding on moderately slippery surfaces, are not absolutely effective when the roads are covered with ice or sleet, and such chains may even damage the tires.

I have found, however, that a much better protection against skidding can be obtained by the use of special antiskidding shoes supported at the sides of each driving wheel and pressed against the roadway by springs, the shoes rotating with the wheel and successively rolling over the ground. One type of such device has already been disclosed in my application Serial No. 16,135, filed Apr. 13, 1935, in which a plurality of radially sliding plungers with antiskidding shoes is described.

I discovered that it is possible to still further improve upon this construction by providing antiskidding shoes in the shape of rocking segments resiliently supported on a special disc attached to the side of a wheel and forming a supplementary antiskidding resilient wheel. The ends of the segments can be hingedly connected together by telescopic links so as to form a resilient antiskidding chain.

Points on the segments which come first in contact with the road are provided with rubber plugs screwed into special sockets and which can be screwed further in from time to time as their tips extending through the segments begin to wear out from rubbing against the surface of the road.

I also provide means for raising the segments and locking them in raised position away from the surface of the road, when the antiskidding feature is not required. In such position the segments form a complete wheel which can replace the tire if the latter becomes deflated.

In a modified construction I provide a separate supporting disc fastened between the brake drum and the wheel and supporting a ring with antiskidding segments. The ring with the segments can be removed, leaving the disc alone, which can serve as a spare wheel in case the tire blows out. This disc is provided with vanes or paddles in order to obtain increased traction in snow or mud.

My invention is more fully described in the accompanying specification and drawings in which:—

Figure 1:
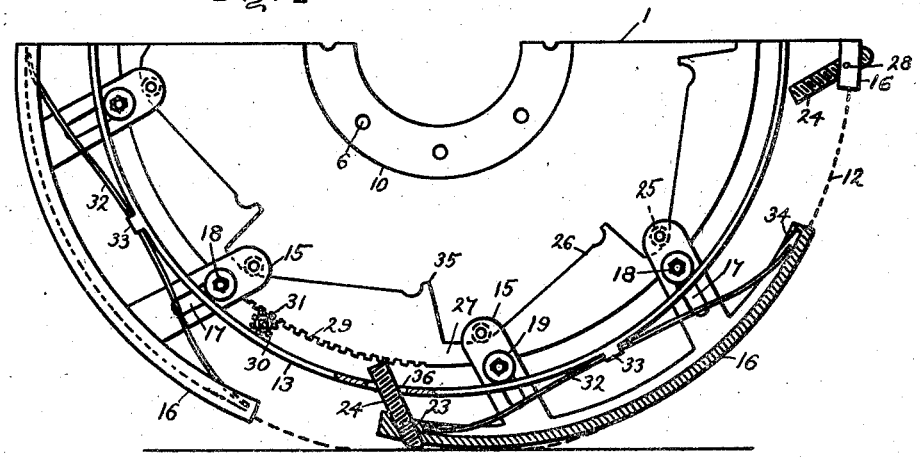
Figure 2:
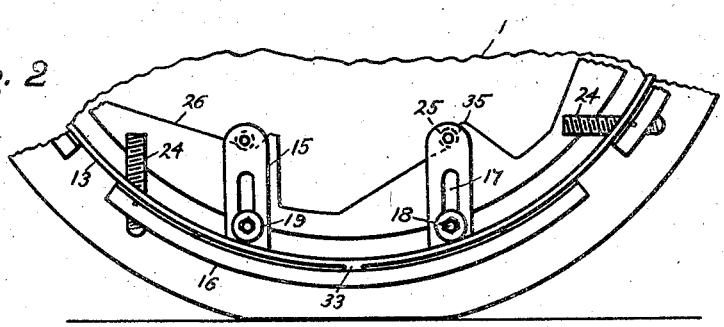
Figure 3:
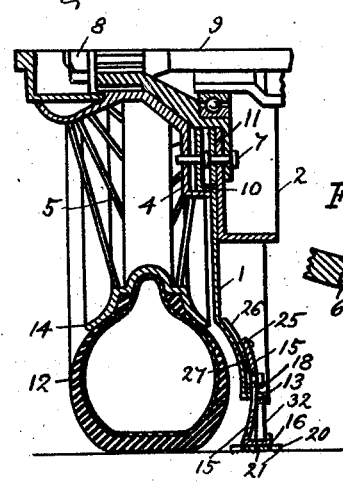
Figure 4:
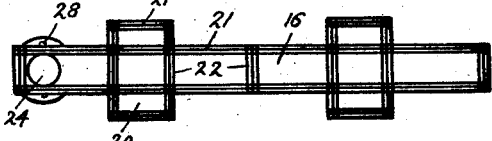
Figures 13, 14:
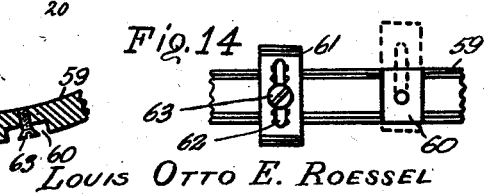

Fig. 1 is a partial elevation of my device partly in section, Fig. 2 is a view of the same in an inoperative position, Fig. 3 is a transverse section of a wheel with my device, Fig. 4 is a bottom view of an antiskidding shoe, Fig. 5 is a sectional view of a modified device, Fig. 6 is an elevation of the modified device, Fig. 7 is a sectional view of another modification, Fig. 8 is a detail view of the modification shown in Figs. 5 and 6, Fig. 9 is a partial elevation of the modification shown in Fig. 7, Fig. 10 is a partial elevation of another modification, Fig. 11 is a detail view of links between the shoes of the last named modification, Fig. 12 is a sectional view of another modification, Fig. 13 is a partial detail view of a modified shoe with adjustable cross-pieces, Fig. 14 is a partial bottom view of the modified shoe shown in Fig. 13, Figs. 15 and 16 are detail views of a modified construction of a supplementary shoe.

My antiskidding device consists of a disc 1 stamped of a piece of sheet metal and formed so as to be clamped between a brake drum 2 (Fig. 3) and a hub 4 of a wheel 5 of an automobile. Holes 6 are provided in the disc fitting on studs 7 which also engage corresponding holes in the hub 4 which is clamped in its place by a nut 8 on a shaft 9. A recess 10 is formed on the disc, the inner shoulder of this recess fitting over an anchor plate 11, and the outer shoulder fitting under the rim of the hub 4. The outer portion of the disc is curved as shown, conforming to the general curvature of the side of a rubber tire 12. A flange 13 is formed on the periphery of the disc. The diameter of this flange is smaller than the diameter of the tire but larger than the diameter of the tire rim 14. The rim or flange 13 is provided with slots for lugs 15 extending from antiskidding shoes 16. The lugs of one shoe are substantially parallel to each other so that they can slide with their slots 17 on guiding bolts 18 provided with large retaining washers 19. The shoes are curved in an arcuate shape, conforming to the curvature of the flange 13. The shoes are provided with transverse side lugs 20 and have grooves 21 and 22 forming sharp antiskidding ridges, extending in longitudinal and transverse directions. The oncoming or rear end of each shoe has a socket 23 threaded inside for a threaded rubber plug 24. The latter is screwed in so that its lower (outer) end extends beyond the outer surface of the shoe and forms a resilient shock absorbing pad, which first meets the surface of the road, before the rest of the shoe comes in contact with it. The ends of the lugs or plungers 15 have rollers 25 engaged by cams 26 of a ring 27.

Cotter pins 28 retain the plugs 24 in their positions. The cam ring 27 has gear teeth 29 at one portion of its periphery in mesh with a pinion 30. The shaft of the pinion is journaled in the disc 1. Its other end 31 is made square and can be turned by a wrench. The lugs 15 are curved conforming to the curvature of the bell-shaped outer portion of the disc 1. A certain amount of play is allowed in the slots for the lugs and under the washers 19 in order to permit one end of the shoe to be depressed ahead of the other when the wheel rolls on the ground, as is shown in Fig. 1. Such rocking action is necessary with long curved shoes (the shoes, however, may be given any desired curvature and may be even made flat). The shoe is preferably given a channel shape, and the bottom plate may be made separately and welded or riveted to the channel, as shown in Fig. 3. A flat spring 32 is placed between the shoe and the flange 13, being retained in its middle portion by a lug 33 on the flange, the ends sliding freely on the bottom of the channel of the shoe and being retained at one end by the socket 23 and by a curved lip 34 on the other. The spring also rocks by its middle portion when the shoe rocks from one side to the other when the wheel is rolling.

By turning the pinion 30 the cam ring 27 can be turned to the left, forcing the cams 26 under the rollers 25 and thereby retracting the shoes inwardly until they rest against the flange 13. The shoes are locked in this position, lugs 35 on the cams resting against the rollers 25. The plugs 24 are parallel to the lugs 15 in order to facilitate the movement of the shoes, and holes 36 are provided in the flange 13 for the plug 24. The slots 17 are made sufficiently wide to permit the rocking action of the shoes.

A modified construction is shown in Figs. 5, 6 and 8. Here the disc 1' is provided with a stiffening rib 37 and vanes 38 stamped out of its sides. The outer portion of the disc is also bell-shaped conforming to the curvature of the tire. A flat ring 39 is attached to the disc 1' by bolts 40. This ring may be split into two or more sections to facilitate its attachment and removal. The line of joint of such segments is indicated at 39' in Fig. 6. It has slots for the vanes 38, a flange 13, and pockets 41 for plungers 42. The plungers have rods 43 passing through holes 44 in the closed ends of the pockets. The ends of the rods are threaded for nuts 45. Springs 46 are placed on the rods inside of the pockets. The ends of the plungers are rounded and provided with holes for pins 47 passing through the sides of channel-shaped shoes 48. The hinged connection between the plungers and the shoes permits the rocking action of the shoes when the automobile is moving. The plate or ring 39 can be removed, leaving the disc 1' with its vanes. This disc serves as an emergency wheel in case of a tire blow-out, the vanes assisting the traction of the wheel in snow, sand or mud. The shoes can be drawn against the rib 37 by tightening the nuts 45.

Another modification is shown in Figs. 7 and 9. Here shoes 49 have lugs 50 passing through corresponding slots in the flange 13 of a disc 1. The ends of the lugs have rollers 51 engaged by the curved ends of a spring 52 supported at the middle by a stud 53 fastened in the side of the disc 1. These rollers are also used for retracting the lugs and the shoes by the cams 26. The ends of the shoes are flexibly connected by flat, preferably resilient, links 54. One end of each link is curved into a tubular shape and is held by a pin 55 passing through the walls of the shoe, and the other end is flat, sliding under a similar pin 56.

Another modification is shown in Fig. 10. Here shoes 49 are also connected by flat telescopic links. These links 57 are made longer, the shoes being shorter, and are provided with supplementary shoes 58 in the middle.

Side lugs on the shoes can be made removable as is shown in Figs. 13 and 14. A shoe 59 has transverse slots 60 at the lower side for blocks 61. The latter have slots 62 for screws 63. Notches 64 are provided at the sides of the slots in order to more firmly retain the blocks in their position by screws 65. With this arrangement it is possible to adjust the transverse position of the blocks so as to place them either centrally, as shown at the left in Fig. 14, or more to one side as shown with dotted lines in the same figure.

Such blocks can be also provided for supplementary shoes on the connecting links as shown in Figs. 15 and 16. Here a block 61 is fastened to a shoe 66 by a screw 63. The shoe, which is shown integral with a link 67, has also a hole 68 in which freely slides a sleeve 69 threaded inside for the rubber plug 24. The sleeve 69 has a slot at one side for the end of a steel spring plate 70, this end being provided with a few sharp teeth biting into the rubber so as to prevent its simultaneous turning. The spring 70 is fastened to the link 67 by a screw 71 fitting into the extension of the hole for the screw 63. The tension of the spring 70 is made such that the sleeve 69 with the plug 24 becomes deflected upward when the shoe rests squarely on the ground, but the plug is pushed down again by the spring when the shoe leaves the ground, and the end of the plug first meets the ground or the surface of the road when the shoe first touches it, thereby dampening the force of the blow and the noise.

I claim as my invention:

1. In an antiskidding device for an automobile, the combination of a disc attached to the wheel of an automobile, a plurality of antiskidding shoes of an arcuate shape and concentric with said disc, lugs near the end of each shoe slidably supported on said disc, springs adapted to press said shoes outwardly through said lugs, means to limit the outward movement of said shoes, said shoes being adapted to touch the ground when said wheel is rolling on the ground, and a rubber plug adjustably fitted in the oncoming end of each shoe, the outer end of said plug being adapted to touch the ground ahead of the other parts of said shoe.

2. In an antiskidding device for an automobile, the combination of a disc attached to the wheel of said automobile, a plurality of antiskidding shoes slidably supported on said disc, the outer portions of said shoes being curved, springs pressing said shoes outwardly, means to limit the outward movement of said shoes, the oncoming ends of said shoes being provided with threaded sockets, and rubber plugs screwed into said sockets and extending beyond the outer surface of said shoes.

3. In an antiskidding device for an automobile, the combination of a disc attached to the wheel of an automobile, a plurality of shoes curved concentrically with said disc and slidably supported thereon, springs adapted to press said shoes outwardly, means to limit the outward movement of said shoes, said shoes being adapted to successively touch the ground when said wheel rolls on the ground, and links flexibly connecting the ends of adjacent shoes.

4. In an antiskidding device for an automobile, the combination of a disc attached to the wheel of an automobile, a plurality of shoes curved concentrically with said disc and slidably supported thereon, springs pressing said shoes outwardly, means to limit the outward movement of said shoes, said shoes being adapted to touch the ground when said wheel rolls on the ground, and links telescopically connecting the adjacent ends of said shoes.

5. In an antiskidding device for an automobile, the combination of a disc attached to the wheel of said automobile, a plurality of shoes curved concentrically with said disc and slidably supported thereon, springs pressing said shoes outwardly, means to limit the outward movement of said shoes, said shoes being adapted to touch the ground when said automobile is moving, links flexibly and telescopically connecting the adjacent ends of said shoes, and supplementary shoes on said links.

6. In an antiskidding device for an automobile, the combination of a disc concentrically attached to the wheel of said automobile, a plurality of shoes, lugs on said shoes slidably supported on said disc, springs adapted to press said shoes with said lugs outwardly, means to limit the outward movement of said shoes, said shoes being adapted to roll on the ground at the side of said wheel when said automobile is moving, a cam ring adapted to raise said shoes into inoperative position away from the ground, and means to manually operate said cam ring.

7. In an antiskidding device for an automobile, the combination of a disc concentrically attached to the wheel of an automobile, the outer portion of said disc being curved so as to form a curved clearance with a side of the tire on said wheel, a plurality of shoes curved concentrically with said disc, plungers extending from end portions of said shoes, plungers of one shoe being in a substantially parallel alignment, means to slidably support said plungers on said disc, said plungers being curved sidewise in accordance with the curvature of said disc, springs adapted to move outwardly said shoes with said plungers, means to limit the outward movement of said shoes, said shoes being adapted to successively touch the ground when said automobile is moving, and means to lock said shoes in their extreme inward position.

8. In an antiskidding device for an automobile, the combination of a disc concentrically attached to the wheel of an automobile, said disc being of a smaller diameter than the tire of said wheel and at a distance therefrom, a plurality of segments removably attached to said disc, a plurality of shoes, lugs on said shoes slidably supported on said segments, springs pressing said shoes with said lugs outwardly, and means to limit the outward movement of said shoes, said shoes being adapted to successively touch the ground when said automobile is moving, portions of one shoe being adapted to be successively moved inwardly compressing said springs.

9. A shoe for an antiskidding device of the class described, said shoe being provided with a hole at one end, a sleeve slidably fitted in said hole and provided with a slot at one side, a rubber block fitted in said sleeve and projecting beyond said sleeve and said shoe, and a spring fastened to the upper side of said shoe and adapted to support said sleeve through said slot thereby also engaging said rubber block.

L. OTTO E. ROESSEL.